United States Patent
Furuya

(10) Patent No.: US 10,123,520 B2
(45) Date of Patent: Nov. 13, 2018

(54) JIG HEAD

(71) Applicant: Globeride, Inc., Tokyo (JP)

(72) Inventor: Hideyuki Furuya, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 341 days.

(21) Appl. No.: 14/674,299

(22) Filed: Mar. 31, 2015

(65) Prior Publication Data

US 2015/0272095 A1  Oct. 1, 2015

(30) Foreign Application Priority Data

Mar. 31, 2014  (JP) ................. 2014-071403

(51) Int. Cl.
| | | |
|---|---|---|
| *A01K 85/00* | (2006.01) | |
| *A01K 83/00* | (2006.01) | |
| *A01K 95/00* | (2006.01) | |

(52) U.S. Cl.
CPC .............. *A01K 85/00* (2013.01); *A01K 83/00* (2013.01); *A01K 95/00* (2013.01)

(58) Field of Classification Search
CPC ........ A01K 83/00; A01K 85/00; A01K 95/00; A01K 91/03; A01K 91/04
USPC ........... 43/44.81, 42.08, 42.09, 42.36, 42.37, 43/42.39, 44.83, 42.49
See application file for complete search history.

(56) References Cited

U.S. PATENT DOCUMENTS

| 83,681 | A | * | 11/1868 | Albee | .............. | A01K 85/00 |
| | | | | | | 43/44.81 |
| 148,926 | A | * | 3/1874 | Cahoon | ............ | A01K 85/00 |
| | | | | | | 43/44.81 |
| 252,628 | A | * | 1/1882 | Smith | ............... | A01K 85/16 |
| | | | | | | 43/42.23 |

(Continued)

FOREIGN PATENT DOCUMENTS

| CA | 2364022 A1 | * | 9/2000 | ........... A01K 91/047 |
| CA | 2501536 A1 | * | 9/2006 | ............. A01K 85/00 |

(Continued)

OTHER PUBLICATIONS

Extended European Search Report dated Sep. 7, 2015 for European Patent Appln. No. 15161322.1.

(Continued)

*Primary Examiner* — Darren W Ark
*Assistant Examiner* — Morgan T Barlow
(74) *Attorney, Agent, or Firm* — Pillsbury Winthrop Shaw Pittman, LLP

(57) ABSTRACT

One object is to provide a jig head including a sinker head and a hook readily replaceable with new one. A jig head includes: a sinker head including an eye to which a fishing line is to be attached; and a hook portion including a shank fixed on the sinker head at one end thereof, and a bend continuous to the other end of the shank and bent in a predetermined direction. The hook portion includes a wide portion widened to form a plane at the one end of the shank. The sinker head includes: an intermediate member having a (Continued)

hook engagement portion configured to be removably engaged with the wide portion; an intermediate member-receiving hole portion configured to receive therein the intermediate member; and an intermediate member-fixing means configured to removably fix the intermediate member in the intermediate member-receiving hole portion.

14 Claims, 12 Drawing Sheets

(56) References Cited

U.S. PATENT DOCUMENTS

| | | | | |
|---|---|---|---|---|
| 524,928 A * | 8/1894 | Bacon | A01K 83/06 43/41 |
| 1,264,658 A * | 4/1918 | King | A01K 85/16 43/42.08 |
| 1,710,102 A * | 4/1929 | Moore | A01K 85/10 43/42.08 |
| 2,419,037 A * | 4/1947 | Safford | A01K 85/16 43/42.05 |
| 2,539,234 A * | 1/1951 | Dobkowski | A01K 91/04 24/136 R |
| 2,561,144 A * | 7/1951 | Seaton | A01K 91/04 24/593.1 |
| 2,582,619 A * | 1/1952 | Blockinger | A01K 93/00 43/44.9 |
| 2,596,201 A * | 5/1952 | Bocchino | A01K 85/16 43/42.04 |
| 2,712,196 A * | 7/1955 | Allen | A01K 91/047 24/122.3 |
| 2,869,278 A * | 1/1959 | Cook | A01K 97/24 24/503 |
| 3,009,279 A * | 11/1961 | Jacobson | A01K 85/18 43/42.09 |
| 3,091,885 A * | 6/1963 | Ulsh | A01K 85/00 43/42.52 |
| 3,138,892 A * | 6/1964 | Hall | A01K 85/00 43/42.25 |
| 3,210,883 A * | 10/1965 | Ulsh | A01K 91/04 24/662 |
| 3,417,503 A * | 12/1968 | Meulnart | A01K 85/10 43/42.08 |
| 3,518,784 A * | 7/1970 | Moss | A01K 91/04 43/42.72 |
| 3,750,323 A * | 8/1973 | Weis | A01K 85/00 43/42.28 |
| 3,826,034 A * | 7/1974 | Herek | A01K 91/04 403/361 |
| 3,897,647 A * | 8/1975 | Black | A01K 85/00 24/115 F |
| 4,030,225 A * | 6/1977 | Earley | A01K 91/04 43/42.09 |
| 4,079,538 A * | 3/1978 | Burnett | A01K 85/02 43/36 |
| 4,125,958 A * | 11/1978 | Cote | A01K 91/04 43/43.12 |
| 4,266,360 A * | 5/1981 | Smith | A01K 85/16 43/42.09 |
| 4,472,903 A * | 9/1984 | Hutson | A01K 95/00 43/44.91 |
| 4,798,022 A * | 1/1989 | Rhoades | A01K 91/04 43/44.83 |
| 4,843,754 A * | 7/1989 | Spelts | A01K 85/00 43/42.1 |
| 4,848,018 A * | 7/1989 | Clarke | A01K 91/04 43/43.12 |
| 4,942,689 A * | 7/1990 | Link | A01K 95/00 43/42.24 |
| 5,070,639 A * | 12/1991 | Pippert | A01K 85/01 43/42.09 |
| 5,076,006 A * | 12/1991 | Kahng | A01K 91/03 43/43.12 |
| 5,105,575 A * | 4/1992 | Robertaccio | A01K 85/00 43/42.37 |
| 5,197,220 A * | 3/1993 | Gibbs | A01K 85/16 43/42.09 |
| 5,222,321 A * | 6/1993 | Lu | A01K 95/005 43/42.53 |
| 5,347,744 A * | 9/1994 | Getschel | A01K 85/01 43/42.15 |
| 5,351,434 A * | 10/1994 | Krenn | A01K 91/03 43/43.12 |
| 5,457,909 A * | 10/1995 | Graves | A01K 95/00 43/44.91 |
| 5,537,775 A * | 7/1996 | Crumrine | A01K 85/00 43/42.38 |
| 5,666,760 A * | 9/1997 | Bramblett | A01K 91/04 24/908 |
| 5,832,655 A * | 11/1998 | Crumrine | A01K 85/00 43/42.36 |
| 6,161,326 A * | 12/2000 | Ratte | A01K 95/02 43/42.39 |
| 6,230,433 B1 * | 5/2001 | Nichols | A01K 85/00 43/42.39 |
| 6,327,808 B1 * | 12/2001 | Zascavage | A01K 85/00 43/42 |
| 6,357,167 B1 * | 3/2002 | Bradford | A01K 85/00 43/42.05 |
| 6,601,336 B1 * | 8/2003 | Link | A01K 85/00 43/42.11 |
| 6,808,349 B1 * | 10/2004 | Boling | A01K 91/04 403/313 |
| 6,836,996 B1 * | 1/2005 | Huppert | A01K 85/00 43/42.39 |
| 6,898,894 B1 * | 5/2005 | Anderson | A01K 85/00 43/42.39 |
| 7,866,085 B1 * | 1/2011 | Ruzicka | A01K 85/00 43/43.1 |
| 8,671,612 B1 * | 3/2014 | Swisher | A01K 85/16 24/635 |
| 8,713,848 B2 * | 5/2014 | Huppert | A01K 91/053 43/42.09 |
| 9,003,689 B1 * | 4/2015 | Rye | A01K 85/00 43/42.09 |
| 2002/0078619 A1 * | 6/2002 | Hurtle, Jr. | A01K 85/00 43/42.39 |
| 2004/0107629 A1 * | 6/2004 | Brzozowski | A01K 91/00 43/43.15 |
| 2005/0055867 A1 * | 3/2005 | Mendoza | A01K 83/04 43/44.82 |
| 2005/0132634 A1 * | 6/2005 | Reed | A01K 85/00 43/44.81 |
| 2005/0172538 A1 * | 8/2005 | Brinkman | A01K 85/00 43/42.36 |
| 2005/0204607 A1 * | 9/2005 | Nichols | A01K 85/00 43/42.37 |
| 2005/0246941 A1 * | 11/2005 | Mitchell | A01K 85/00 43/42.36 |
| 2006/0053680 A1 * | 3/2006 | Petitjean | A01K 85/08 43/42.47 |
| 2006/0117643 A1 * | 6/2006 | Thorne | A01K 85/00 43/42.39 |
| 2006/0260178 A1 * | 11/2006 | Jones | A01K 91/04 43/42.36 |
| 2006/0260179 A1 * | 11/2006 | Guigo | A01K 91/04 43/42.36 |
| 2007/0271838 A1 * | 11/2007 | Lowiecki | A01K 85/02 43/42.39 |
| 2007/0277423 A1 * | 12/2007 | Edwards | A01K 85/00 43/42.13 |
| 2008/0216384 A1 * | 9/2008 | Hockmeyer | A01K 85/00 43/42.37 |
| 2008/0276521 A1 * | 11/2008 | Turpin | A01K 85/00 43/42.06 |
| 2009/0044441 A1 * | 2/2009 | Neal | A01K 91/04 43/44.83 |

(56) References Cited

U.S. PATENT DOCUMENTS

| | | | |
|---|---|---|---|
| 2009/0100740 A1* | 4/2009 | Chan | A01K 85/16 43/42.48 |
| 2009/0127801 A1* | 5/2009 | Heikkila | A01K 85/00 277/591 |
| 2009/0282726 A1* | 11/2009 | Herasymchuk | A01K 85/01 43/42.23 |
| 2010/0223833 A1* | 9/2010 | Rigney | A01K 85/00 43/42.22 |
| 2010/0229454 A1* | 9/2010 | Cunningham | A01K 85/00 43/42.31 |
| 2010/0307048 A1* | 12/2010 | Simmons | A01K 85/00 43/42.1 |
| 2011/0035987 A1* | 2/2011 | Nicholson | A01K 85/00 43/42.28 |
| 2011/0232156 A1* | 9/2011 | Burdick | A01K 85/16 43/42.09 |
| 2011/0314723 A1* | 12/2011 | Taylor | A01K 85/16 43/42.49 |
| 2012/0000111 A1* | 1/2012 | Griffin | A01K 85/00 43/42.09 |
| 2012/0005946 A1* | 1/2012 | Bennis | A01K 85/00 43/42.53 |
| 2012/0079757 A1* | 4/2012 | Rye | A01K 85/01 43/42.09 |
| 2012/0096757 A1* | 4/2012 | Langer | A01K 85/00 43/42.24 |
| 2013/0276350 A1* | 10/2013 | Smith | A01K 85/02 43/42.38 |
| 2014/0237889 A1* | 8/2014 | Tamburro | A01K 85/00 43/42.09 |
| 2014/0237891 A1* | 8/2014 | Donahoe | A01K 95/00 43/44.87 |
| 2014/0259869 A1* | 9/2014 | Scholfield | A01K 83/06 43/42.36 |
| 2015/0013211 A1* | 1/2015 | Schoenike | A01K 93/00 43/44.91 |

FOREIGN PATENT DOCUMENTS

| | | | | |
|---|---|---|---|---|
| CA | 2501536 A1 | * | 9/2006 | A01K 85/00 |
| CA | 2784477 A1 | * | 6/2011 | A01K 91/04 |
| CA | CA 2784477 A1 | * | 6/2011 | A01K 91/04 |
| CA | 2840824 A1 | * | 7/2014 | A01K 91/04 |
| CA | 2840824 A1 | * | 7/2014 | A01K 91/04 |
| CA | 2851630 A1 | * | 9/2014 | A01K 95/00 |
| CA | 2851630 A1 | * | 9/2014 | A01K 95/00 |
| CN | 201312520 Y | | 9/2009 | |
| CN | 202232631 U | | 5/2012 | |
| CN | 202680277 U | | 1/2013 | |
| DE | 10327002 B3 | * | 10/2004 | A01K 85/00 |
| DE | 10327002 B3 | * | 10/2004 | A01K 85/00 |
| DE | 102010047372 A1 | * | 4/2012 | A01K 83/06 |
| DE | 102010047372 A1 | * | 4/2012 | A01K 83/06 |
| DE | 202014002077 U1 | * | 4/2014 | A01K 91/03 |
| DE | 202014002077 U1 | * | 4/2014 | A01K 91/03 |
| FR | 2987227 A1 | * | 8/2013 | A01K 83/06 |
| FR | 2987227 A1 | * | 8/2013 | A01K 83/06 |
| GB | 690084 A | * | 4/1953 | A01K 95/00 |
| GB | 2034396 A | * | 6/1980 | A01K 91/04 |
| JP | 2007222071 A | * | 9/2007 | |
| JP | 2009-125069 | | 6/2009 | |
| JP | 2010098961 A | * | 5/2010 | |
| JP | 2011078353 A | * | 4/2011 | |
| JP | 2011-110032 | | 6/2011 | |
| JP | 2011135896 A | * | 7/2011 | |
| JP | 2012-165732 | | 9/2012 | |
| JP | 2013-085535 | | 5/2013 | |
| JP | 2013208061 A | * | 10/2013 | |
| JP | 2014193129 A | * | 10/2014 | |
| JP | 2015039352 A | * | 3/2015 | |
| JP | 2015104334 A | * | 6/2015 | |
| JP | 2017012154 A | * | 1/2017 | |
| KR | 100848700 B1 | | 7/2008 | |
| KR | 10-2012-0005715 A | | 1/2012 | |
| KR | 101243769 B1 | * | 3/2013 | |
| WO | WO-9904627 A1 | * | 2/1999 | A01K 83/00 |
| WO | WO-2005029953 A1 | * | 4/2005 | A01K 85/00 |
| WO | WO 2007002287 A2 | * | 1/2007 | A01K 85/00 |
| WO | WO-2007002287 A2 | * | 1/2007 | A01K 85/00 |
| WO | WO 2008092368 A1 | * | 8/2008 | A01K 83/06 |
| WO | WO-2008092368 A1 | * | 8/2008 | A01K 83/06 |
| WO | WO 2010135780 A1 | * | 12/2010 | A01K 85/00 |
| WO | WO-2010135780 A1 | * | 12/2010 | A01K 85/00 |
| WO | WO 2013043746 A1 | * | 3/2013 | A01K 83/06 |
| WO | WO-2013043746 A1 | * | 3/2013 | A01K 83/06 |
| WO | WO-2015164908 A1 | * | 11/2015 | A01K 85/00 |

OTHER PUBLICATIONS

Office Action dated Jan. 12, 2017 in Chinese Application 201510126516.5.

Non-Final Office Action Japanese Patent Application No. 2014-071403 dated Apr. 25, 2017 with English translation.

Communication pursuant to Article 94(3) EPC EP Application No. 15 161 322.1 dated Sep. 6, 2018.

\* cited by examiner

JIG HEAD

CROSS-REFERENCE TO RELATED APPLICATIONS

This application is based on and claims the benefit of priority from Japanese Patent Application Serial No. 2014-071403 (filed on Mar. 31, 2014), the contents of which are hereby incorporated by reference in their entirety.

TECHNICAL FIELD

The present invention relates to a jig head including a sinker head serving as a weight for a fishing line and a hook integrally fixed on the sinker head.

BACKGROUND

A tenya jig head, which includes a sinker head serving as a fishing weight and a hook, has been conventionally used as a fishing tackle for tenya fishing. For example, the tenya jig head 90 as shown in FIG. 11 includes a sinker head 91 and a hook 92 having a rear end thereof embedded in the sinker head 91 for integration. The sinker head 91 includes an eye 93 to which a fishing line is to be attached.

The sinker heads in conventional tenya jig heads have been formed of lead. This is because lead is highly workable and has a high specific gravity of about 11.5. Sinker heads having a higher specific gravity are smaller and thus easier to use.

In Japanese Patent Application Publication No. 2013-85535 (the "'535 Publication"), a tenya jig head for use with a small bait fish is disclosed. A hook is integrally fixed on the weight body (the sinker head). The hook includes a barb diverging from the hook and projecting toward the weight body. Thus, it is asserted that a baitfish can be put on the hook only by piercing the hook into the baitfish.

In Japanese Patent Application Publication No. 2012-165732 (the "'732 Publication"), a tenya jig head for catching a cutlassfish is disclosed. The weight is provided at the middle thereof a sleeve extending through the weight, and a hook can be inserted into and pulled out from the sleeve. One end of the hook is pierced from a tail to abdomen and mouth of a baitfish, and the other end of the hook is inserted through the sleeve in the weight. The hook is fixed on the weight as follows. A wire having a pin on one end thereof is passed through a retaining hole provided in one end of the hook and further through the bottom portion and inner portion of the weight and pulled out upwardly; then, a snood connecting part is provided on the wire.

As shown in the '535 Publication, conventional tenya jig heads include a hook integrally fixed on a sinker head. Therefore, a tenya jig head having a worn hook is replaced with new one and disposed of. It is unreasonable to dispose of an entire tenya jig head having a worn hook.

Since the environmental load of lead has recently been emphasized, lead is being replaced with other alloys, particularly tungsten, for use in tenya jig heads. Tungsten has a higher specific gravity than lead (about 19.0) and is hard enough to undergo almost no deformation during use. Since the prime cost is higher than that of lead and the workability is lower than that of lead, a weight made of tungsten is expensive. Therefore, it is not preferable to dispose of a tenya jig head including a sinker head made of tungsten only because the hook is worn.

In the '732 Publication, the hook can be separated from the weight and replaced with new one. However, this hook is a special one, not an ordinary hook. Additionally, the procedure to fix the hook on the weight is complex and thus is troublesome for anglers not used to it.

In the conventional tenya jig head shown in FIG. 11, a body of the tenya jig head is divided into two parts, and a hook having eyes is welded between these two parts. The metal used for the welding has a lower specific gravity than lead and tungsten. Therefore, the welding part lowers the specific gravity of the entire tenya jig head.

SUMMARY

The problems described above are related to tenya jig heads as an example but are common to any jig heads. One object of the present invention is to provide a jig head including a hook and a sinker head which permits simple replacement of the hook with new one.

Means for Solving the Problem

First Aspect

A jig head 10 of the first aspect comprises: a sinker head 20 including an eye 21 to which a fishing line 11 is to be attached; and a hook portion 30 including a shank 31 fixed on the sinker head 20 at one end thereof, and a bend 32 continuous to the other end of the shank 31 and bent in a predetermined direction. The hook portion 30 includes a wide portion (e.g., a ring 35 as a line eye) widened to form a plane at the one end of the shank 31. The sinker head 20 comprises: an intermediate member 50 having a hook engagement portion 51 configured to be engaged with the wide portion; an intermediate member-receiving hole portion 42 configured to receive therein the intermediate member 50; and an intermediate member-fixing means 60 configured to fix the intermediate member 50 in the intermediate member-receiving hole portion 42.

EXPLANATION OF TERMS

A "sinker head 20" is a "fishing weight" formed of a metal such as lead, a zinc alloy, or tungsten and integrally including an eye 21 to which a fishing line 11 is to be attached.

Upon "engagement" of the "hook engagement portion 51," the hook portion 30 is prohibited from moving in the axial direction thereof; and when fixed by the intermediate fixing means 60, the hook portion 30 is immobilized with respect to the sinker head 20 even under forces in any directions.

Operation

To fix the hook portion 30 on the sinker head 20, the wide portion 35 is engaged with the hook engagement portion 51 of the intermediate member 50, and the intermediate member 50 is fixed with the intermediate member-fixing means 60.

To remove the hook portion 30 from the sinker head 20, the intermediate member 50 is removed from the intermediate member-fixing means such that the wide portion 35 of the hook portion 30 is disengaged from the intermediate member 50.

When the hook portion 30 is worn out, a new hook portion 30 can be installed on the sinker head 20 for use as a tenya jig head 10.

Variation 1 of First Aspect

The first aspect can be modified to the following variation.

The intermediate member 50 includes a tapered surface 52 narrower toward the bend 32 in the hook portion 30.

The intermediate member-receiving hole portion 42 includes a tapered hole 43 configured to receive the tapered surface 52 of the intermediate member 50.

The intermediate member-fixing means 60 is configured to crimp the tapered surface 52 of the intermediate member 50 on the tapered hole 43 of the intermediate member-receiving hole portion 42.

Operation

The wide portion 35 of the hook portion 30 is engaged with the hook engagement portion 51 of the intermediate member 50. The intermediate member 50 is inserted into the intermediate member-receiving hole portion 42 in the sinker head 20 such that the tapered surface 52 of the intermediate member 50 is crimped on the tapered hole 43 of the intermediate member-receiving hole portion 42.

The hook portion 30 can be securely fixed with such simple components that can be readily fabricated.

Variation 2 of First Aspect

The first aspect may be modified as follows.

The intermediate member 50 includes a shank-receiving hole portion 55 configured to receive the one end of the shank 31 of the hook portion 30.

The intermediate member-fixing means 60 comprises: a fixing engagement portion 57 provided at an end of the intermediate member 50 opposite to the shank-receiving hole portion 55; a fixing hole portion 58 in the sinker head 20, communicating with the intermediate member-receiving hole portion 42 and configured to be engaged with the fixing engagement portion 57; and a fixing means configured to fix the fixing engagement portion 57 received in the fixing hole portion 57.

Operation

The wide portion 35 of the hook portion 30 is inserted into the shank-receiving hole portion 55 of the intermediate member 50 and is engaged with the hook engagement portion 51. The intermediate member 50 is inserted into the intermediate member-receiving hole portion 42 in the sinker head 20 such that the fixing engagement portion 57 of the intermediate member 50 is inserted and fixed in the fixing hole portion 58 communicating with the intermediate member-receiving hole portion 42.

Variation 3 of First Aspect

The first aspect may be modified such that the wide portion is constituted by a ring 35 formed of a bent end of the hook portion 30 opposite to a point, and the hook engagement portion 51 has a groove-like shape to be engaged with the ring 35.

Operation

The hook portion 30 has a ring 35 at an end opposite to a point. Since such a conventional hook portion 30 is replaceably used, a wide range of applications can be obtained.

Advantages

The first aspect provides a jig head including a sinker head and a hook (hook portion) readily replaceable with new one.

BRIEF DESCRIPTION OF THE DRAWINGS

FIG. 1b is an exploded perspective view showing the components in FIG. 1a.

FIG. 2a is an exploded perspective view showing the components of the tenya jig head in FIG. 1a.

FIG. 3 is a vertical sectional view showing a part of the components of the tenya jig head in FIG. 1a.

FIGS. 4a to 4d show a process of fabricating the tenya jig head shown in FIG. 1a.

FIG. 5b is a perspective view showing a part of the components of the tenya jig head in FIG. 5a.

FIG. 6b is an exploded perspective view showing the components in FIG. 6a.

FIG. 7b is an exploded perspective view showing the components in FIG. 7a.

FIG. 8b is a perspective view showing a part of the components of the tenya jig head in FIG. 8a.

DESCRIPTION OF EXAMPLE EMBODIMENTS

Figure 5A:
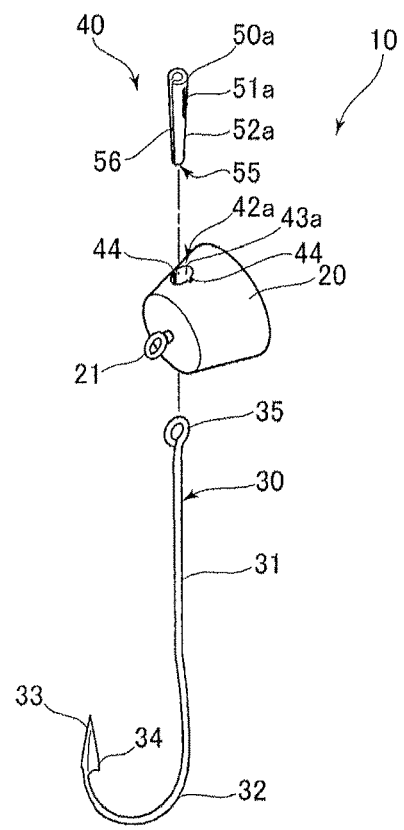
FIG. 5a is a perspective view showing a variation of the tenya jig head wherein the components are exploded.
Figure 5B:
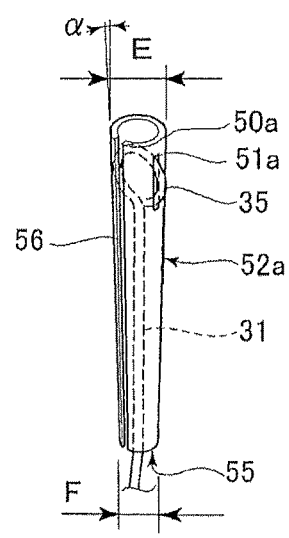
Figure 6A:
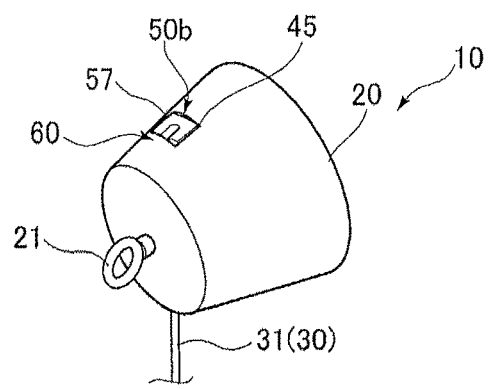
FIG. 6a is a perspective view showing a variation of the tenya jig head.
Figure 6B:
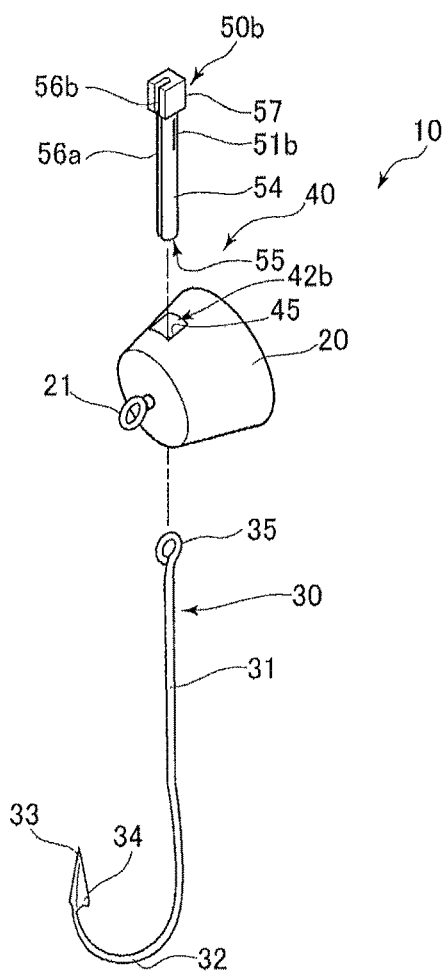
Figure 7A:
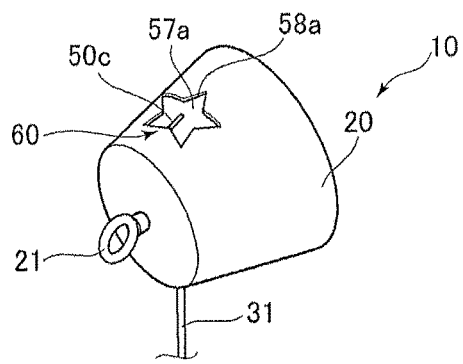
FIG. 7a is a perspective view showing a variation of the tenya jig head.
Figure 7B:
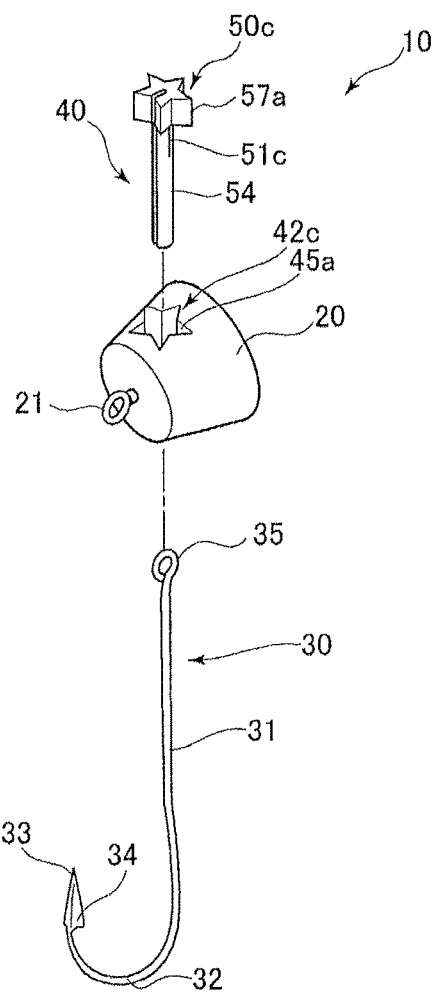
Figure 8A:
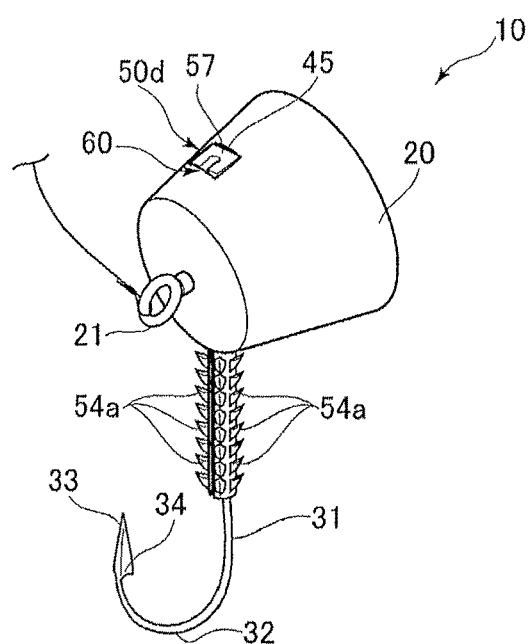
FIG. 8a is a perspective view showing a variation of the tenya jig head.
Figure 8B:
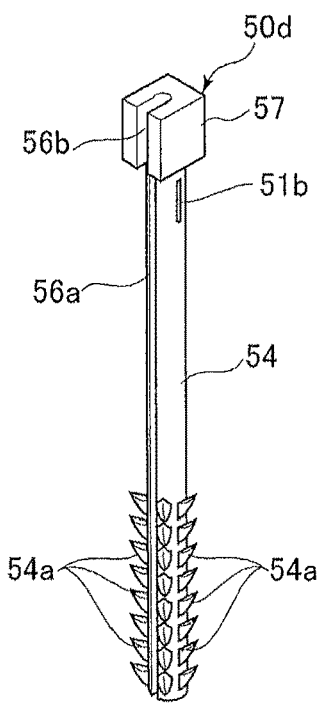
Figure 9:
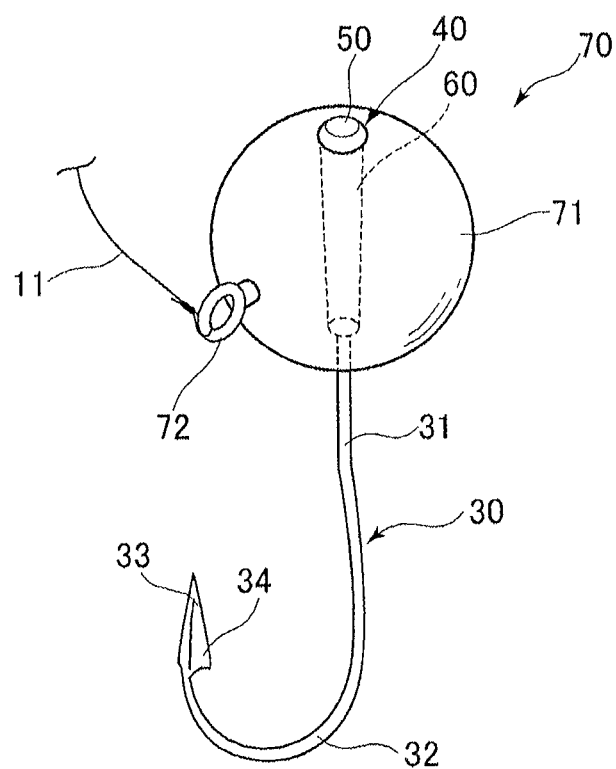
FIG. 9 is a perspective view showing a jig head suspended with a fishing line.
Figure 10:
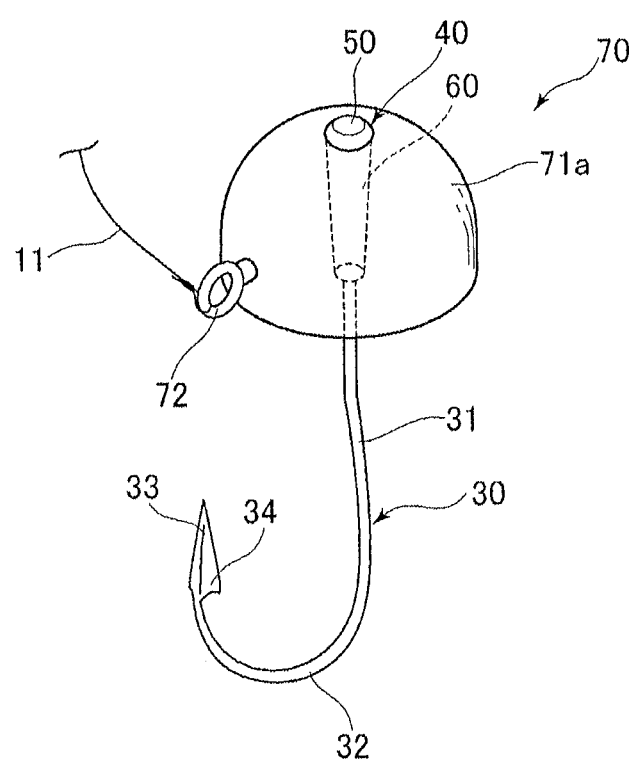
FIG. 10 is a perspective view showing a variation of the jig head.
Figure 11:
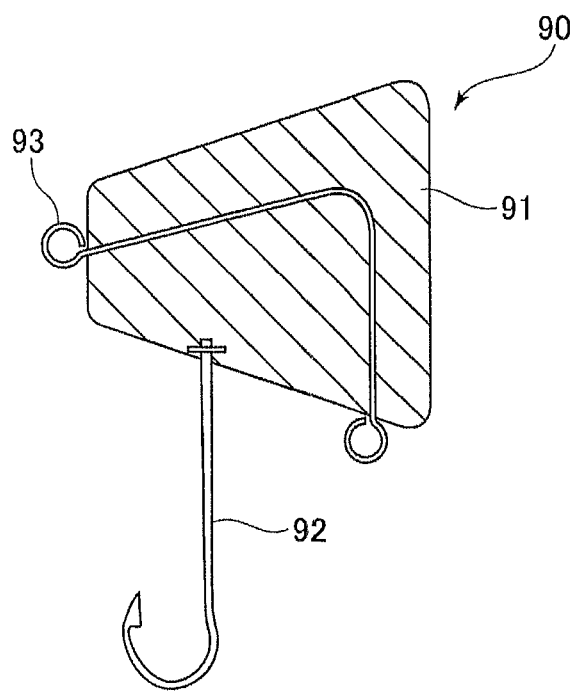
FIG. 11 is a cross-sectional view illustrating one example of a conventional tenya jig head.

An embodiment of the present disclosure will now be described with reference to the attached drawings. Reference will be made to FIGS. 1a to 10. FIGS. 1a to 4d show a first embodiment, FIGS. 5a and 5d show a second embodiment, FIGS. 6a and 6b show a third embodiment, FIGS. 7a and 7b show a fourth embodiment, FIGS. 8a and 8b show a fifth embodiment, FIG. 9 shows a sixth embodiment, and FIG. 10 shows a seventh embodiment.

First Embodiment

Figure 1A:
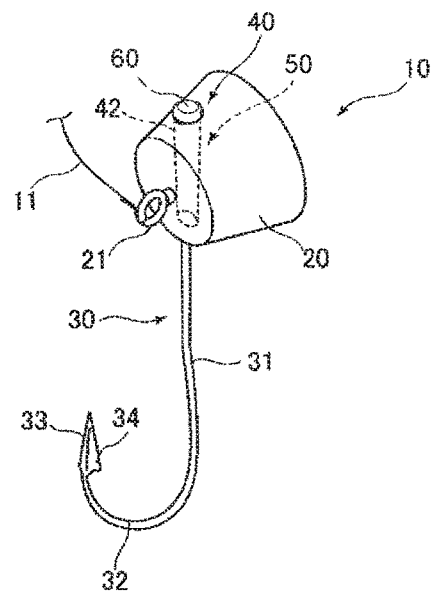
FIG. 1a is a perspective view showing a tenya jig head according to a first embodiment of the present invention, the tenya jig head being suspended with a fishing line.

As shown in FIG. 1a, the tenya jig head 10 according to the first embodiment may include a sinker head 20 and a hook portion 30. A sinker head 20 is a fishing weight formed of a metal having a high specific gravity such as lead, a zinc alloy, or tungsten and including an eye (line eye) 21 to which a fishing line 11 is attached. The fishing line 11 connected to the eye 21 may run along the fishing rod and may be wound around the fishing line reel. The tenya jig head 10 under water is positioned such that the lower left part of the FIG. 1a faces the surface of the water.

In the embodiment, the hook portion 30 may be a wire rod formed of steel and provided with a coating for reduce friction and may include a shank 31 having a substantially linear shape and a bend 32 bent toward the lower right part of FIG. 1a. One end of the shank 31 may be removably fixed on the sinker head 20, and the other end of the shank 31 may be continuous to the bend 32.

In the embodiment, the hook portion 30 may be a conventional hook commercially available. The hook (hook portion 30) shown in FIG. 1b may have a ring 35 formed by bending the end of the hook opposite to the point. The ring 35 may serve as a line eye when the hook is used singly. The hole portion 36 in the ring 35 is oriented substantially orthogonally to the direction in which the bend 32 is bent. Additionally, the orientation of the hole portion 36 in the ring 35 is not particularly limited. The present invention may be applied to a hook having the hole portion 36 oriented in substantially the same direction as the bend 32 is bent.

The tip end (the point) of the bend 32 may constitute a hook 33 for piercing a fish biting the bait and may have a barb 34. For example, when a shrimp is put on the hook portion 30 to catch a porgy, the tail of the shrimp may be cut off to leave one segment, and the point is pierced into the center of the tail through the abdomen and let out from the middle of the abdomen.

The tenya jig head 10 according to the present invention may be characterized in that the hook portion 30, or a conventional hook, is removably fixed on the sinker head 20. That is, the sinker head 20 may include a hook attachment mechanism 40 which is removable and can be engaged with the ring 35 of the hook portion 30.

Figure 1B:
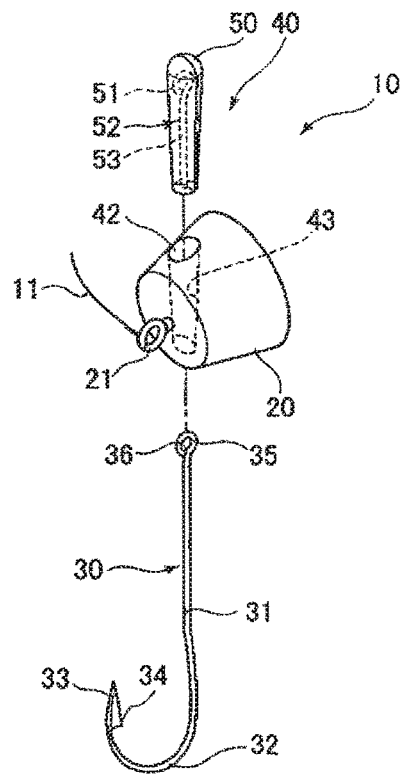

As shown in FIGS. 1a and 1b, the tenya jig head 10 may include a sinker head 20 and a hook portion 30. The hook portion 30 may include a shank 31 having a substantially linear shape and a bend 32 bent forward in a predetermined direction. The shank 31 may have a ring 35 in one end thereof, the ring 35 having a hole portion 36 oriented substantially orthogonally to the direction in which the bend 32 is bent. The ring 35 may constitute a wide portion widened to form a plane.

The sinker head 20 may include the hook attachment mechanism 40 described above. That is, as shown in FIG. 1b, the sinker head 20 may include an intermediate member 50 having hook engagement portions 51 to be removably engaged with the ring 35, an intermediate member-receiving hole portion 42 into which the intermediate member 50 is to be inserted, and an intermediate member-fixing means 60 for removably fixing the intermediate member 50 in the intermediate member-receiving hole portion 42.

Figure 2A:
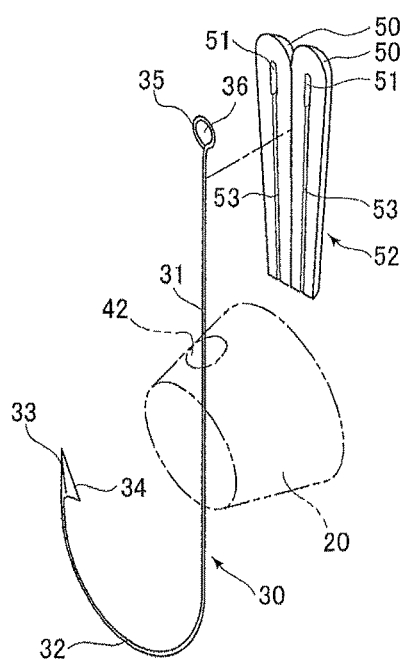

The outer shape of the intermediate member 50 may include a tapered surface 52 narrower toward the bend 32 of the hook portion 30, or toward the lower part of the FIG. 1b. As shown in FIG. 2a, the intermediate member 50 may be vertically divided into two halves, and in the opposing surfaces of the two halves may be formed hook engagement portions 51 for engagement with the ring 35, as well as grooves 53 into which the shank 31 of the hook portion 30 is to be inserted.

Figure 2B:
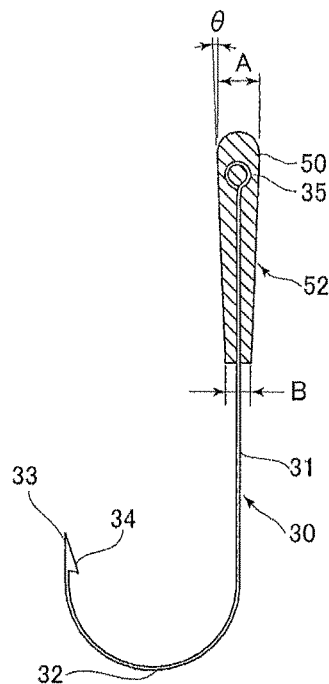
FIG. 2b is a sectional view showing the tenya jig head as viewed from the right side.

The above two halves may be put together so as to fit the ring 35 and the shank 31 of the hook portion 30 into the hook engagement portions 51 and the grooves 53. As shown in FIG. 2b, the ring 35 and the shank 31 of the hook portion 30 may be fixed in the intermediate member 50. The intermediate member 50 may be positioned vertically in the longitudinal direction and have a circular section. The intermediate member 50 may also have a tapered surface 52 narrower toward the lower part of FIG. 2b. Supposing that the intermediate member 50 has a diameter A at the upper end thereof and a diameter B at the lower end thereof, the diameters hold the relation A>B, and the tapered surface may have an angle of inclination $\theta$.

Figure 3:
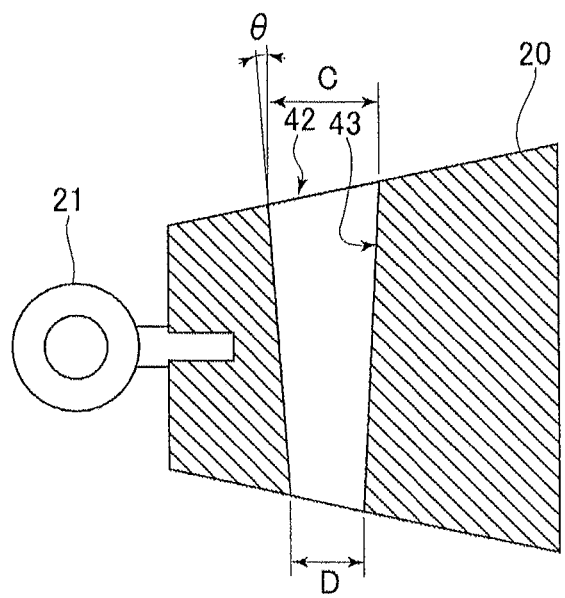

As shown in FIG. 3, the intermediate member-receiving hole portion 42 may have a tapered hole 43 extending through the sinker head 20 and capable of receiving the tapered surface 52 of the intermediate member 50. Supposing that the tapered hole 43 has a diameter C at the upper end thereof and a diameter D at the lower end thereof, the diameters hold the relation C>D, and the tapered surface may have the same angle of inclination $\theta$ as in the intermediate member 50.

The intermediate member-fixing means 60 may be a fixing means for crimping the tapered surface 52 of the intermediate member 50 on the tapered hole 43 of the intermediate member-receiving hole portion 42.

Figure 4A:
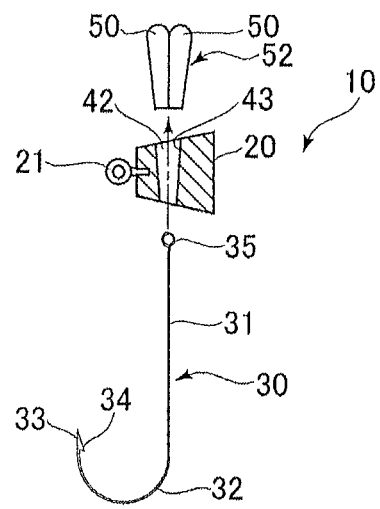

That is, as shown in FIG. 4a, the ring 35 and the shank 31 of the hook portion 30 may be inserted from below into the intermediate member-receiving hole portion 42 of the sinker head 20. The hook portion 30 projected through the intermediate member-receiving hole portion 42 may be nipped at the ring 35 and the shank 31 by the two halves of the intermediate member 50.

Figure 4B:
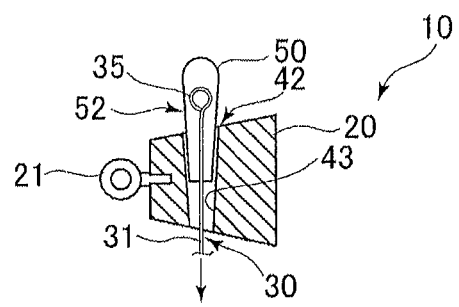

FIG. 4b shows the intermediate member 50 being moved downward and inserted into the intermediate member-receiving hole portion 42 of the sinker head 20. The tapered surface 52 of the intermediate member 50 may be fitted on the tapered hole 43 of the intermediate member-receiving hole portion 42.

Figure 4C:
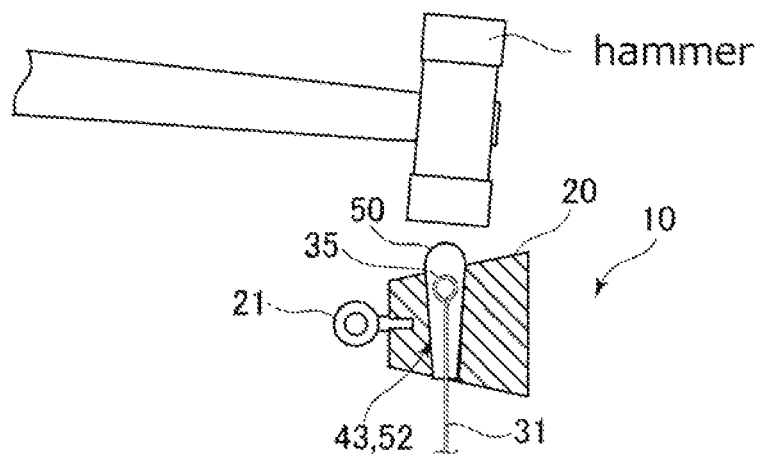

FIG. 4c shows the intermediate member 50 being knocked with a hammer at the top end thereof and driven into the intermediate member-receiving hole portion 42 in the sinker head 20.

Figure 4D:
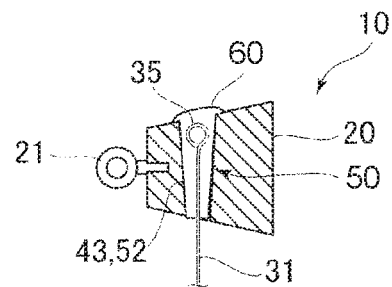

FIG. 4d shows the intermediate member 50 knocked and crushed at the top end thereof to crimp the intermediate member 50 on the intermediate member-receiving hole portion 42. Since the hook portion 30 may be fixed in the sinker head 20, the hook portion 30 may not waver or rotate idly even under a large force when a porgy is caught.

The intermediate member 50 deformed can be pulled out with a tool such as a nipper and replaced with a new hook portion 30. The new hook portion 30 can be fixed in the sinker head 20 using a new intermediate member 50 as described above.

Second Embodiment

Next, a variation of the hook attachment mechanism 40 will be described based on FIG. 5. In FIG. 5a, the shapes of the intermediate member 50a and the intermediate member-receiving hole portion 42a may be different from those shown in FIG. 1b. That is, as shown in FIG. 5b, the intermediate member 50a may be a tube having a tapered surface 52a narrower downward and a vertical groove 56. The intermediate member 50a may also have a shank-receiving hole portion 55 into which the ring 35 and the shank 31 of the hook portion 30 can be inserted. Supposing that the tapered hole 43a in the intermediate member-receiving hole portion 42a has an angle of inclination $\alpha$ and that the intermediate member 50a has a diameter E at the upper end thereof and a diameter F at the lower end thereof, the diameters hold the relation E>F, and the tapered surface 52a may have an angle of inclination $\alpha$.

Additionally, in the upper portion of the intermediate member 50a may be formed hook engagement portions 51a to be engaged with the ring 35 of the hook portion 30. The hook engagement portions 51a may be vertical through-holes formed in the tube at opposed positions such that the widthwise ends of the ring 35 project outward beyond the outer circumference of the intermediate member 50a.

In the embodiment, the intermediate member 50a may be formed of a flexible thermoplastic resin, but may be formed of other desired materials.

The intermediate member-receiving hole portion 42a may have a tapered hole 43a extending through the sinker head 20 and capable of receiving the tapered surface 52a of the intermediate member 50a. In the upper surface of the tapered hole 43a may be formed grooves 44 for receiving the widthwise ends of the ring 35.

The operation of the second embodiment may be substantially the same as described for the above embodiment with reference to FIGS. 4a to 4d. That is, as shown in FIG. 5a, the ring 35 and the shank 31 of the hook portion 30 may be inserted from below into the intermediate member-receiving hole portion 42a of the sinker head 20. The intermediate member 50a may be attached to the ring 35 and the shank 31 projected through the intermediate member-receiving hole portion 42a.

That is, the ring 35 and the shank 31 may be inserted into the shank-receiving hole portion 55 in the intermediate member 50a. The ring 35 may be moved through the vertical groove 56 in the intermediate member 50a, and the widthwise ends of the ring 35 may be inserted into the hook engagement portions 51a (the vertical through-holes) in the intermediate member 50a. The hook portion 30 may be fixed in the intermediate member 50a. This operation can be readily implemented since the intermediate member 50a may be formed of a plastic material.

Then, the intermediate member 50a may be inserted into the intermediate member-receiving hole portion 42a such that the tapered surface 52a of the intermediate member 50a may be fitted into the tapered hole 43 of the intermediate member-receiving hole portion 42a. The intermediate member 50a may be knocked with a hammer at the top end thereof and driven into the intermediate member-receiving hole portion 42 for crimping. In other respects, this embodiment may be the same as the embodiment described above.

Third Embodiment

Another variation of the hook attachment mechanism 40 will be described based on FIGS. 6a and 6b. In FIGS. 6a and 6b, the shapes of the intermediate member 50b and the intermediate member-receiving hole portion 42b may be different from those shown in FIG. 1b. That is, as shown in FIG. 6b, the intermediate member 50b may include a tube 54 having a vertical groove 56a and a fixing engagement portion 57 disposed on the top end of the tube 54. The tube 54 may also have a shank-receiving hole portion 55 into which the ring 35 and the shank 31 of the hook portion 30 can be inserted. Additionally, in the upper portion of the tube 54 may be formed hook engagement portions 51b to be engaged with the ring 35 of the hook portion 30. The hook engagement portions 51b may be vertical through-holes formed in the tube 54 at opposed positions such that the widthwise ends of the ring 35 project outward beyond the outer circumference of the tube 54.

In the embodiment, the fixing engagement portion 57 may have a substantially rectangular shape and have a vertical groove 56b communicating with the vertical groove 56a in the tube 54.

The intermediate member-receiving hole portion 42b may have a through-hole extending through the sinker head 20 and capable of receiving the tube 54 of the intermediate member 50b. In the upper portion of the through-hole may be formed a fixing hole portion 45 capable of receiving the fixing engagement portion 57 having a substantially rectangular shape. The fixing hole portion 45 may have a size for press-fitting the fixing engagement portion 57.

The operation of the second embodiment may be substantially the same as described for the above embodiment with reference to FIGS. 4a to 4d. That is, as shown in FIG. 6b, the ring 35 and the shank 31 of the hook portion 30 may be inserted from below into the intermediate member-receiving hole portion 42b of the sinker head 20. The intermediate member 50b may be attached to the ring 35 and the shank 31 projected through the intermediate member-receiving hole portion 42b. The ring 35 and the shank 31 may be inserted into the shank-receiving hole portion 55 in the tube 54 of the intermediate member 50b. The ring 35 may be moved through the vertical groove 56a in tube 54 of the intermediate member 50b, and the widthwise ends of the ring 35 may be inserted into the hook engagement portions 51b (the vertical through-holes) in the intermediate member 50b. The hook portion 30 may be fixed in the intermediate member 50b.

Then, the tube 54 of the intermediate member 50b may be inserted into the intermediate member-receiving hole 42b, and the fixing engagement portion 57 having a substantially rectangular shape may be securely press-fitted into the fixing hole portion 45 in the sinker head 20. Since the fixing engagement portion 57 has a substantially rectangular shape, the hook portion 30 may not waver or rotate idly even under a large force. In other respects, this embodiment may be the same as the embodiments described above.

Fourth Embodiment

FIGS. 7a and 7b show a variation of the embodiment shown in FIGS. 6a and 6b. The differences are as follows. In the intermediate member 50c, the fixing engagement portion 57a provided on an end (the upper end in the figures) of the tube 54 has a star-shaped section in a plane view. In the intermediate member-receiving hole 42c, the fixing hole portion 45a capable of receiving the fixing engagement portion 57a having a star-shaped section may be formed in the upper end of the through-hole capable of receiving the tube 54 of the intermediate member 50c. The fixing hole portion 45a may have a size for press-fitting the fixing engagement portion 57a.

In the fourth embodiment, since the fixing engagement portion 57a has a star-shaped section, the hook portion 30 may not waver or rotate idly even under a large force. In other respects, this embodiment may be almost the same as the embodiment described with reference to FIGS. 6a and 6b.

Fifth Embodiment

FIGS. 8a and 8b show a variation of the embodiment shown in FIGS. 6a and 6b. The differences are as follows. In the intermediate member 50d, a lower portion of the tube 54 may constitute a protrusion protruding downward from the sinker head 20, and the protrusion may have a large number of needle-like projections on the circumference thereof, as shown in FIG. 8b. In other respects, this embodiment may be the same as the above embodiment.

As shown in FIG. 8a, these members may be assembled such that the hook portion 30 protruding downward from the sinker head 20 may have a large number of needle-like projections 54a on the circumference thereof. For example, when a shrimp is put on the hook portion 30 to catch a porgy, the shrimp is also put on the large number of projections 54a. This may make it more unlikely that a soft shrimp comes off from the hook portion 30 piercing the shrimp, the hook portion 30 provided with a coating for reducing the friction.

Welding is not required in fixing the hook portion 30 on the sinker head 20 in the embodiments 1 to 5. This may prevent reduction in specific gravity due to welding and may support the demand for sinker heads having a small volume and a high specific gravity obtained by using an expensive material such as tungsten.

Sixth Embodiment

The embodiments described above may be in the form of a tenya jig head 10 as an example, but the technique according the present invention can be applied to a jig head 70.

An application to the jig head 70 may be as follows. FIG. 9 shows the jig head 70 including a weight 71 having a spherical shape. The weight 71 may have an eye 72 to which a fishing line 11 is attached. The weight 71 may also include a hook attachment mechanism 40 which is removable and can be engaged with, e.g., the ring 35 as a wide portion of the hook portion 30. The hook attachment mechanism 40 may be the same as in the above embodiments, and detailed description thereof is omitted.

Seventh Embodiment

FIG. 10 shows a variation of the embodiment shown in FIG. 9. The only difference may be that the weight 71a of the jig head 70a may have a hemispherical shape.

INDUSTRIAL APPLICABILITY

The present invention can be applied in the fields of manufacture, dealing, and rental business of fishing gears and instructor business of outdoor sports, etc.

What is claimed is:

1. A jig head comprising:
   a sinker head including an eye to which a fishing line is to be attached; and
   a hook portion being fixed to the sinker head, the hook portion comprising a shank and a bend, the shank having a first end and a second end, the first end including a wide portion that is widened to form a plane thereat and the second end being continuous into the bend of the hook portion, the bend being bent in a predetermined direction;
   wherein the sinker head further comprises an intermediate member and an intermediate member-receiving hole portion, the intermediate member having a hook engagement portion that surrounds the wide portion of the first end of the shank;
   the intermediate member further comprising a tapered surface that narrows towards the bend in the shank of the hook portion;
   the intermediate member-receiving hole portion comprising a tapered through hole, the tapered through hole having a first end and a second end, the tapered through hole extending along a width of the sinker head and tapering from the first end to the second end in a longitudinal direction such that the second end is narrower than the first end, and both of the first end and the second end opening to an outer peripheral surface of the sinker head;
   wherein the tapered through hole receives the tapered surface of the intermediate member therein such that the tapered surface is engaged with a surface of the tapered through hole, and
   wherein the intermediate member comprises a crimped surface at an end of the tapered surface of the intermediate member, the crimped surface fixing the intermediate member in the intermediate member-receiving hole portion, and the crimped surface being provided at the first end of the tapered through hole of the intermediate member-receiving hole portion.

2. The jig head of claim 1, wherein
   the wide portion is constituted by a ring formed of a bent end of the hook portion opposite to a point, and
   the hook engagement portion has a groove shape to be engaged with the ring.

3. The jig head of claim 1, wherein the crimped surface of the intermediate member extends over the first end of the tapered through hole of the sinker head.

4. The jig head of claim 1, wherein the tapered surface and the tapered through hole have the same angle of inclination.

5. The jig head of claim 1, wherein the intermediate member comprises two halves that engage with the wide portion.

6. The jig head of claim 5, wherein the intermediate member has linear grooves into which at least part of the shank is inserted.

7. The jig head of claim 6, wherein the wide portion comprises a ring, and wherein the hook engagement portion has a groove-like shape for receipt of the ring therein.

8. The jig head of claim 5, wherein the wide portion comprises a ring, and wherein the hook engagement portion has a groove for receipt of the ring.

9. The jig head of claim 1, wherein the hook engagement portion has a complimentary groove for the wide portion.

10. A method of forming a jig head, the jig head comprising: a sinker head including an eye to which a fishing line is to be attached and a tapered through hole extending along a width of the sinker head, the tapered through hole having a first end and a second end each opening to an outer peripheral surface of the sinker head and tapering from the first end to the second end in a longitudinal direction such that the second end is narrower than the first end; a hook portion comprising a shank and a bend, the shank having a first end and a second end, the second end of the shank being connected to a bend of the hook portion, the bend being bent in a predetermined direction; and an intermediate member having a hook engagement portion that surrounds a portion of the first end of the shank and a tapered surface; and the method comprising:
    engaging the first end of the shank of the hook portion with the hook engagement portion of the intermediate member such that the tapered surface of the intermediate member is positioned to narrow towards the bend of the hook portion;
    inserting the tapered surface of the intermediate member into the tapered through hole of the sinker head;
    driving the intermediate member into the tapered through hole of the sinker head; and
    forming a crimped surface on an end of the intermediate member to fix the intermediate member in the tapered through hole, the crimped surface being provided at the first end of the tapered through hole, and the hook portion extending through the second end of the tapered through hole.

11. The method according to claim 10, wherein the first end of the shank of the hook portion includes a wide portion that is widened to form a plane therat, and wherein the engaging of the first end of the shank comprises surrounding the wide portion of the first end of the shank with the hook engagement portion of the intermediate member.

12. The method according to claim 11, wherein the wide portion at the first end of the shank has a ring, and wherein the hook engagement portion has a groove shape to be engaged with the ring, and wherein the engaging of the first end of the shank comprises inserting the ring into the groove shape.

13. The method according to claim 11, wherein the intermediate member comprises two halves with opposing surfaces that are configured to enclose the wide portion of the shank, and wherein the engaging of the first end of the shank comprises enclosing the opposing surface of the two halves together to engage the wide portion.

14. The method according to claim 10, wherein the hook engagement portion has a groove therein that is complimentary to a shape of the first end of the shank of the hook portion, and wherein the engaging of the first end of the shank comprises inserting the shank into the groove of the hook engagement portion.

\* \* \* \* \*